G. STRICKER.
DRAIN LID FOR COOKING UTENSILS.
APPLICATION FILED APR. 6, 1914.

1,148,634.

Patented Aug. 3, 1915.

WITNESSES:
L. J. Fischer
Fred C. Fischer.

INVENTOR:
Gertrude Stricker,
BY
F. G. Fischer,
ATTORNEY.

UNITED STATES PATENT OFFICE.

GERTRUDE STRICKER, OF KANSAS CITY, MISSOURI.

DRAIN-LID FOR COOKING UTENSILS.

1,148,634.　　　　Specification of Letters Patent.　　Patented Aug. 3, 1915.

Application filed April 6, 1914.　Serial No. 829,815.

*To all whom it may concern:*

Be it known that I, GERTRUDE STRICKER, a citizen of the United States, residing at Kansas City, in the county of Jackson and State of Missouri, have invented certain new and useful Improvements in Drain-Lids for Cooking Utensils, of which the following is a specification.

This invention relates to covers for cooking utensils, and the present invention relates more particularly to handles for said covers.

The object of the invention is to provide a simple, inexpensive handle for securely locking a cover in position upon a cooking utensil, so that the same can be tipped to drain off surplus boiling water while retaining vegetables, or other solid contents.

Figure 1:
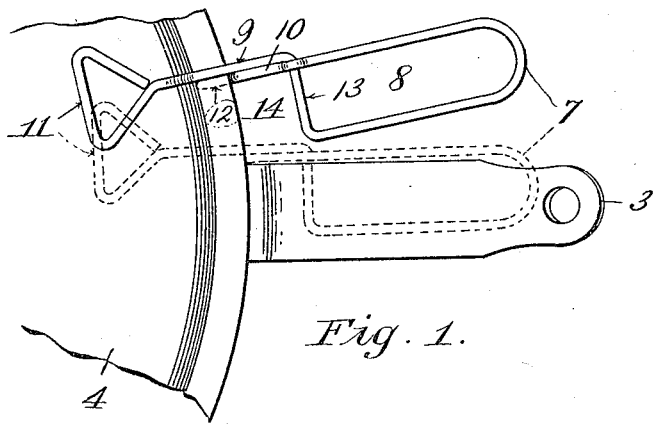
Figure 2:
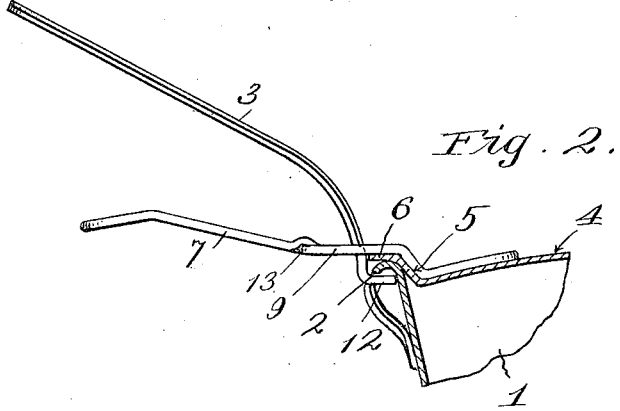
Figure 3:
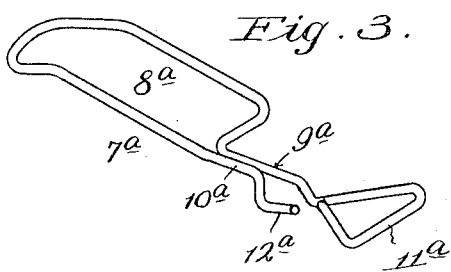

The present invention is an improvement over the device disclosed in United States Letters Patent No. 1,089,092, issued jointly to myself and William Stricker, and in order that the present invention may be fully understood, reference will now be made to the accompanying drawings, in which:

Figure 1 is a plan view of a lid in position upon a stew pan and provided with the present invention. Fig. 2 is a broken vertical section of the stew pan and its lid provided with the invention. Fig. 3 is a detail perspective of a modified form of handle for the cover.

1 designates a stew pan or other cooking vessel having a peripheral flange 2 at its upper margin and a handle 3 of usual form projecting therefrom.

4 designates a lid or cover for the vessel, said lid or cover being of the customary form and having a circular bevel portion 5 and a flat marginal portion 6 to rest against the flange 2.

7 designates a handle constituting the novel feature of the present invention. Handle 7 in its preferred form is made from one piece of wire formed into a longitudinal loop 8, parallel members 9 and 10 connected with loop 8, a triangular loop 11 connected with member 9, and a hook 12 connected with member 10. The forward end of loop 8 terminates in a transverse shoulder 13 spaced a sufficient distance from the adjacent margin of the cover 4 to leave a recess 14, so that the loop 8 can be adjusted beneath the handle 3, as disclosed by dotted lines Fig. 1. The transverse shoulder 13 passes beneath the member 10 and connects with member 9, which is spot-welded or otherwise permanently secured to member 10 to increase the rigidity of the handle 7. The forward portion of member 9 and the triangular loop 11 are spot-welded or otherwise rigidly secured to the cover 4, so that considerable upward pressure may be exerted on the handle 7 to firmly hold the cover 4 upon the vessel 1 when the latter is tipped to drain boiling water therefrom. The hook-member 12 extends downwardly and forwardly to engage the underside of flange 2, as disclosed by Fig. 2, when the cover 4 is in position upon the vessel 1, and secures said cover upon the vessel when the upward pressure above referred to is applied to the handle 7.

When the cover 4 is adjusted to bring the handle 7 beneath the handle 3, the cover 4 can be firmly locked upon the utensil by pressing the handles 3 and 7 toward each other, thus causing the hook-member 12 to engage the underside of margin 2 which acts as a fulcrum, whereby the upward pressure on handle 7 exerts downward pressure on the cover, so that the same will be reliably held upon the utensil to retain the solid contents thereof when it is tipped to drain off boiling water.

The modified form disclosed by Fig. 3 is similar to the preferred form of handle disclosed by Fig. 1, except that the transverse shoulder 13 does not pass beneath the member 10 as in said preferred form. Referring in detail to said modified form, 7ᵃ designates the handle which is made from one piece of wire bent to form a longitudinal loop 8ᵃ, parallel members 9ᵃ, 10ᵃ, connected with loop 8ᵃ, a triangular loop 11ᵃ connected with member 9ᵃ, and a hook-member 12ᵃ connected with the member 10ᵃ. As in the preferred form members 9ᵃ, and 10ᵃ, are, preferably, welded or otherwise rigidly secured together.

Having thus described my invention, what I claim and desire to secure by Letters Patent, is:

The combination with a vessel having a marginal flange and a handle, of a cover for said vessel having a handle rigidly secured thereto and provided with a hook member to engage said marginal flange whereby the cover may be held upon the vessel by pressing the handles together when the vessel is tilted, the cover handle having a shoulder spaced from the margin of the cover to permit it to pass beneath the vessel handle, substantially as described.

In testimony whereof I affix my signature, in the presence of two witnesses.

GERTRUDE STRICKER.

Witnesses:
 F. G. FISCHER,
 R. E. HAMILTON.

Copies of this patent may be obtained for five cents each, by addressing the "Commissioner of Patents. Washington, D. C."